J. S. COTTER.
SAW TOOL.
APPLICATION FILED SEPT. 10, 1909.

988,290.

Patented Mar. 28, 1911.

WITNESSES

John Samuel Cotter
INVENTOR

UNITED STATES PATENT OFFICE.

JOHN SAMUEL COTTER, OF SABULA, IOWA, ASSIGNOR TO E. C. STEARNS & CO., OF SYRACUSE, NEW YORK.

SAW-TOOL.

988,290.  Specification of Letters Patent.  Patented Mar. 28, 1911.

Application filed September 10, 1909. Serial No. 517,178.

*To all whom it may concern:*

Be it known that I, JOHN S. COTTER, of Sabula, Iowa, have invented new and useful Improvements in Saw-Tools, of which the following is a specification.

The object of my invention is to produce an inexpensive device to accommodate both saws having fine and coarse teeth in the operation of filing the cleaning teeth shorter than the cutting teeth.

Figure 1:
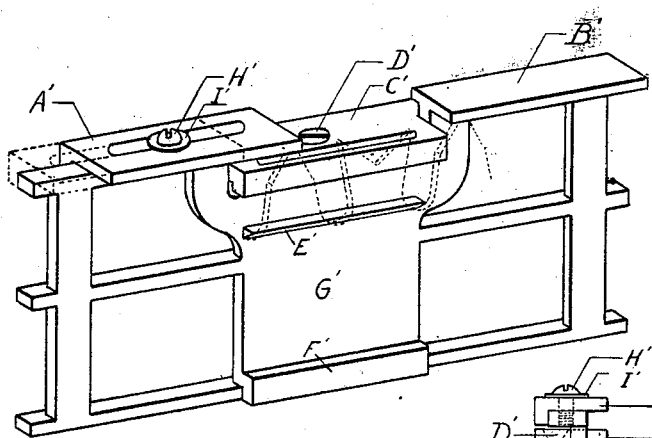
Figure 2:
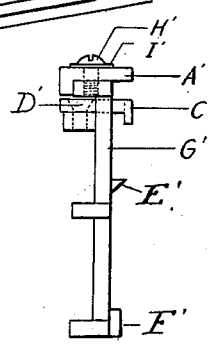

Figure 1 shows a saw tool having my improvement in place on a saw. Fig. 2 is an end elevation showing my improvement and the method of attaching.

G'. is the frame of the saw tool having a central depressed portion in which is mounted the slotted filing guide C'. This guide is vertically adjustable by loosening the screw H. and placing shims under guide C'. On one side of the depressed portion of the frame is an overhanging shelf B' adapted to hook over the points of the teeth of a saw when the frame is placed flat against it and on the other side is a sliding member similar in form and position to the said shelf except that it may be moved to partially cover the said central depressed portion and clamped in that position by the screw H'.

My improvement consists of the slide A' having a longitudinal slot through which the screw H' passes and screws into the frame G' and in the combination and arrangement of parts hereinafter described. When the screw H' is loosened the slide A may be moved to cover a greater or less portion of the gap in the center of the tool. The function of the adjustable slide A is to make it possible to support the tool on the points of the cutting teeth immediately adjacent on each side of the cleaning tooth to be shortened however small the distance between the points of said cutting teeth may be. On the contrary, in case a saw tool of this general type not having my improvement and of size capable of resting correctly on a large saw should be used on a small saw whose teeth were comparatively close together it would not be possible to support the saw tool on the cutting teeth immediately adjacent on each side to the cleaning tooth to be shortened. On one side the adjacent cutting tooth would protrude through the opening in the filing guide C and the saw tool would rest on the second tooth. Two undesirable results would follow such usage: The unprotected point of the cutting tooth protruding through the filing guide would be liable to be filed off; and, the tool resting on the nearest cutting tooth on one side and on the second nearest on the other side and the saw being curved would cause one point of the cleaning tooth to be filed shorter than the other. Both of these results my device successfully prevents.

Having thus described my invention I claim as new:

A saw filing tool consisting of a filing guide and means for holding said filing guide in position on the teeth of a saw, said means consisting of a frame adapted to rest against the side of the saw and having a shelf-like projection at one end adapted to rest on the tooth-points of the saw, said guide being attached to said frame, and a slide adjustable toward and from the shelf-like projection attached to said frame at the other end and adapted to rest on said tooth-points and partially cover said filing guide.

In testimony whereof I sign my name in the presence of two witnesses.

JOHN SAMUEL COTTER.

Witnesses:
W. G. NEWSOME,
AUGUST WEIHS.